(12) United States Patent
Langhammer

(10) Patent No.: US 10,055,195 B2
(45) Date of Patent: Aug. 21, 2018

(54) VARIABLE PRECISION FLOATING-POINT ADDER AND SUBTRACTOR

(71) Applicant: Altera Corporation, San Jose, CA (US)

(72) Inventor: Martin Langhammer, Alderbury (GB)

(73) Assignee: Altera Corporation, San Jose, CA (US)

( * ) Notice: Subject to any disclaimer, the term of this patent is extended or adjusted under 35 U.S.C. 154(b) by 60 days.

(21) Appl. No.: 15/270,495

(22) Filed: Sep. 20, 2016

(65) Prior Publication Data

US 2018/0081633 A1     Mar. 22, 2018

(51) Int. Cl.
*G06F 7/42*     (2006.01)
*G06F 7/50*     (2006.01)
*G06F 5/01*     (2006.01)

(52) U.S. Cl.
CPC ............... *G06F 7/50* (2013.01); *G06F 5/012* (2013.01); *G06F 2205/00* (2013.01); *G06F 2207/48* (2013.01)

(58) Field of Classification Search
CPC .................................. G06F 7/50; G06F 5/012
USPC .................................................. 708/495–514
See application file for complete search history.

(56) References Cited

U.S. PATENT DOCUMENTS

| | | | |
|---|---|---|---|
| 3,434,114 A | 3/1969 | Arulpragasam et al. | |
| 5,696,711 A | 12/1997 | Makineni | |
| 5,790,445 A * | 8/1998 | Eisen | G06F 7/485 708/505 |
| 6,085,212 A * | 7/2000 | Oberman | G06F 7/483 708/505 |
| 6,480,872 B1 | 12/2002 | Choquette | |
| 6,988,119 B2 | 1/2006 | Hoskote et al. | |
| 7,948,267 B1 | 5/2011 | Mauer et al. | |
| 8,645,449 B1 | 2/2014 | Langhammer | |
| 8,706,790 B1 | 4/2014 | Langhammer | |
| 9,053,045 B1 | 6/2015 | Langhammer et al. | |
| 9,104,474 B2 | 8/2015 | Kaul et al. | |
| 2002/0194240 A1 | 12/2002 | Pangal et al. | |
| 2004/0254971 A1 | 12/2004 | Dirker et al. | |
| 2006/0117080 A1 | 6/2006 | Lutz et al. | |
| 2010/0023568 A1 | 1/2010 | Hickey et al. | |
| 2013/0007084 A1 | 1/2013 | Nystad | |

(Continued)

FOREIGN PATENT DOCUMENTS

WO     01-09712 A1     2/2001
WO     2013-148619 A1     10/2013

*Primary Examiner* — Tan V. Mai
(74) *Attorney, Agent, or Firm* — Treyz Law Group, P.C.; Jason Tsai

(57) ABSTRACT

An integrated circuit may include a floating-point adder that supports variable precisions. The floating-point adder may receive first and second inputs to be added, where the first and second inputs each have a mantissa and an exponent. The mantissa and exponent values may be split into a near path and a far path using a dual path floating-point adder architecture depending on the difference of the exponents and on whether an addition or subtraction is being performed. The mantissa values may be left justified, while the sticky bits are right justified. The hardware for the largest mantissa can be used to support the calculations for the smaller mantissas using no additional arithmetic structures, with only some multiplexing and decoding logic.

20 Claims, 11 Drawing Sheets

(56) References Cited

U.S. PATENT DOCUMENTS

2014/0188968 A1 7/2014 Kaul et al.
2016/0062954 A1 3/2016 Ruff et al.

* cited by examiner

US 10,055,195 B2

VARIABLE PRECISION FLOATING-POINT ADDER AND SUBTRACTOR

BACKGROUND

This invention relates generally to integrated circuit and, in particular, to integrated circuits with floating-point arithmetic circuitry.

Programmable logic devices (PLDs) include logic circuitry such as look-up tables (LUTs) and sum-of-product based logic that are designed to allow a user to customize the circuitry to the user's particular needs. This configurable logic is typically divided into individual logic circuits that are referred to as logic elements (LEs). The LEs may be grouped together to form larger logic blocks referred to as logic array blocks (LABs) that may be configured to share the same resources (e.g., registers and memory). In addition to this configurable logic, PLDs also include programmable interconnect or routing circuitry that is used to connect the inputs and outputs of the LEs and LABs. The combination of this programmable logic and routing circuitry is referred to as soft logic.

Besides soft logic, PLDs may also include specialized processing blocks that implements specific predefined logic functions and thus cannot be configured by the user. Such specialized processing blocks may include a concentration of circuitry on a PLD that has been partly or fully hardwired to perform one or more specific tasks, such as a logical or a mathematical operation. Examples of structures that are commonly implemented in such specialized processing blocks include: adders, multipliers, arithmetic logic units (ALUs), barrel-shifters, various memory elements (such as FIFO/LIFO/SIPO/RAM/ROM/CAM blocks and register files), logic AND/NAND/OR/NOR arrays, etc., or combinations thereof.

One particularly useful type of specialized processing block that has been provided on PLDs is a digital signal processing (DSP) block. A conventional DSP block includes a floating-point adder that supports a fixed precision (i.e., a fixed exponent and mantissa width). It may be desirable, however, to configure the DSP to support a wide range of intermediate precisions to help improve the functional density of the DSP block.

It is within this context that the embodiments described herein arise.

SUMMARY

The embodiments herein relate generally to an integrated circuit and, more particularly, to an integrated circuit that includes a multi-precision floating-point adder. The floating-point adder may receive first and second floating-point numbers each with a mantissa and an exponent. The floating-point adder may be implemented using a dual-path adder architecture that splits the first and second numbers into a near path and a far path. The near path may be taken when the difference in the exponents of the first and second numbers is equal to or less than one, whereas the far path may be taken when the difference in the exponents is greater than one.

The floating-point adder may include at least a subtraction circuit and a normalization circuit in the near path and may also include at least an alignment circuit and an addition/subtraction (+/−) circuit in the far path. The floating-point adder may include a multiplexer that selectively outputs a result from one of the near and far paths.

In accordance with an embodiment, the floating-point adder may be operable in at least a first mode that supports a first mantissa size for the first and second numbers and also in a second mode that supports a second mantissa size that is different than the first size. For example, the floating-point adder may be operable in modes supporting mantissa widths of 10 bits, 11 bits, 12 bits, 14 bits, with a total width of (including sign bit and exponent width) of 14 bits, 23 bits, more than 23 bits, etc.

To support the variable mantissa widths, the alignment circuit in the far path may include a right shifter that outputs a shifted value, a maximum shift lookup table circuit that outputs a desired maximum shift value depending on the current mantissa width being supported, a comparator that compares the maximum shift value to the difference in the exponents, and a gating circuit that selectively passes through the shifted value based on the comparison step at the comparator. The right shifter may include various levels of logic OR gates for selectively combining an appropriate number of least significant bits (LSBs) to generate a sticky bit for the floating-point rounding determination.

The addition/subtraction circuit in the far path may include a first summing circuit for outputting a sum value (i.e., the sum of the first and second numbers), a second summing circuit for outputting an incremented sum value (i.e., the sum of the first and second numbers plus one), a bit-wise logic XOR gate for selectively inverting the second number, and a bit-wise logic OR gate for selectively propagating through a "1" at the LSB positions. The selective propagation may only be activated for smaller mantissa widths. While the mantissas are always left justified, the sticky bit should always be right justified such that the sticky bit is fixed in the lowest bit position. Alternatively, some of the LSB bits may be bypassed using a multiplexer that receives the sticky bit or a carry-out signal from a lower summing segment.

Further features of the invention, its nature and various advantages will be more apparent from the accompanying drawings and following detailed description.

DETAILED DESCRIPTION

The embodiments presented herein relate to integrated circuits and, more particularly, to floating-point adders/subtractors on an integrated circuit. It will be recognized by one skilled in the art, that the present exemplary embodiments may be practiced without some or all of these specific details. In other instances, well-known operations have not been described in detail in order not to unnecessarily obscure the present embodiments.

Figure 1:
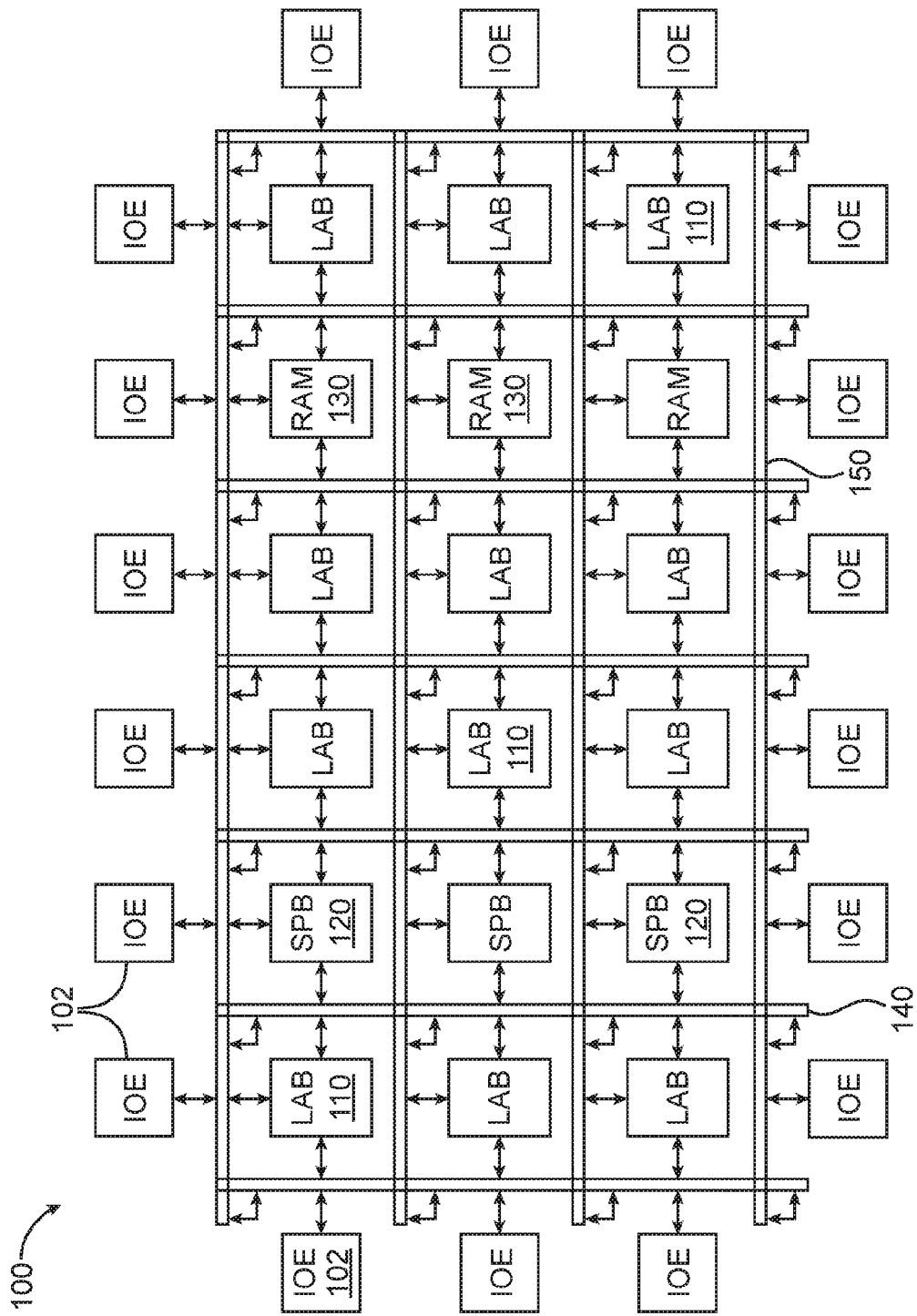
FIG. 1 is a diagram of an illustrative integrated circuit having specialized processing blocks in accordance with an embodiment.

An illustrative embodiment of an integrated circuit such as programmable logic device (PLD) 100 having an exemplary interconnect circuitry is shown in FIG. 1. As shown in FIG. 1, the programmable logic device (PLD) may include a two-dimensional array of functional blocks, including logic array blocks (LABs) 110 and other functional blocks, such as random access memory (RAM) blocks 130 and specialized processing blocks such as specialized processing blocks (SPB) 120. Functional blocks such as LABs 110 may include smaller programmable regions (e.g., logic elements, configurable logic blocks, or adaptive logic modules) that receive input signals and perform custom functions on the input signals to produce output signals.

Programmable logic device 100 may contain programmable memory elements. Memory elements may be loaded with configuration data (also called programming data) using input/output elements (IOEs) 102. Once loaded, the memory elements each provide a corresponding static control signal that controls the operation of an associated functional block (e.g., LABs 110, SPB 120, RAM 130, or input/output elements 102).

In a typical scenario, the outputs of the loaded memory elements are applied to the gates of metal-oxide-semiconductor transistors in a functional block to turn certain transistors on or off and thereby configure the logic in the functional block including the routing paths. Programmable logic circuit elements that may be controlled in this way include parts of multiplexers (e.g., multiplexers used for forming routing paths in interconnect circuits), look-up tables, logic arrays, AND, OR, NAND, and NOR logic gates, pass gates, etc.

The memory elements may use any suitable volatile and/or non-volatile memory structures such as random-access-memory (RAM) cells, fuses, antifuses, programmable read-only-memory memory cells, mask-programmed and laser-programmed structures, mechanical memory devices (e.g., including localized mechanical resonators), mechanically operated RAM (MORAM), combinations of these structures, etc. Because the memory elements are loaded with configuration data during programming, the memory elements are sometimes referred to as configuration memory, configuration RAM (CRAM), configuration memory elements, or programmable memory elements.

In addition, the programmable logic device may have input/output elements (IOEs) 102 for driving signals off of device 100 and for receiving signals from other devices. Input/output elements 102 may include parallel input/output circuitry, serial data transceiver circuitry, differential receiver and transmitter circuitry, or other circuitry used to connect one integrated circuit to another integrated circuit. As shown, input/output elements 102 may be located around the periphery of the chip.

If desired, the programmable logic device may have input/output elements 102 arranged in different ways. For example, input/output elements 102 may form one or more columns of input/output elements that may be located anywhere on the programmable logic device (e.g., distributed evenly across the width of the PLD). If desired, input/output elements 102 may form one or more rows of input/output elements (e.g., distributed across the height of the PLD). Alternatively, input/output elements 102 may form islands of input/output elements that may be distributed over the surface of the PLD or clustered in selected areas.

The PLD may also include programmable interconnect circuitry in the form of vertical routing channels 140 (i.e., interconnects formed along a vertical axis of PLD 100) and horizontal routing channels 150 (i.e., interconnects formed along a horizontal axis of PLD 100), each routing channel including at least one track to route at least one wire. If desired, the interconnect circuitry may include double data rate interconnections and/or single data rate interconnections.

If desired, routing wires may be shorter than the entire length of the routing channel. A length L wire may span L functional blocks. For example, a length four wire may span four blocks. Length four wires in a horizontal routing channel may be referred to as "H4" wires, whereas length four wires in a vertical routing channel may be referred to as "V4" wires.

Different PLDs may have different functional blocks which connect to different numbers of routing channels. A three-sided routing architecture is depicted in FIG. 1 where input and output connections are present on three sides of each functional block to the routing channels. Other routing architectures are also intended to be included within the scope of the present invention. Examples of other routing architectures include 1-sided, 1½-sided, 2-sided, and 4-sided routing architectures.

In a direct drive routing architecture, each wire is driven at a single logical point by a driver. The driver may be associated with a multiplexer which selects a signal to drive on the wire. In the case of channels with a fixed number of wires along their length, a driver may be placed at each starting point of a wire.

Note that other routing topologies, besides the topology of the interconnect circuitry depicted in FIG. 1, are intended to be included within the scope of the present invention. For example, the routing topology may include diagonal wires, horizontal wires, and vertical wires along different parts of their extent as well as wires that are perpendicular to the device plane in the case of three dimensional integrated circuits, and the driver of a wire may be located at a different point than one end of a wire. The routing topology may include global wires that span substantially all of PLD 100, fractional global wires such as wires that span part of PLD 100, staggered wires of a particular length, smaller local wires, or any other suitable interconnection resource arrangement.

Furthermore, it should be understood that embodiments may be implemented in any integrated circuit. If desired, the functional blocks of such an integrated circuit may be arranged in more levels or layers in which multiple functional blocks are interconnected to form still larger blocks. Other device arrangements may use functional blocks that are not arranged in rows and columns.

Figure 2:
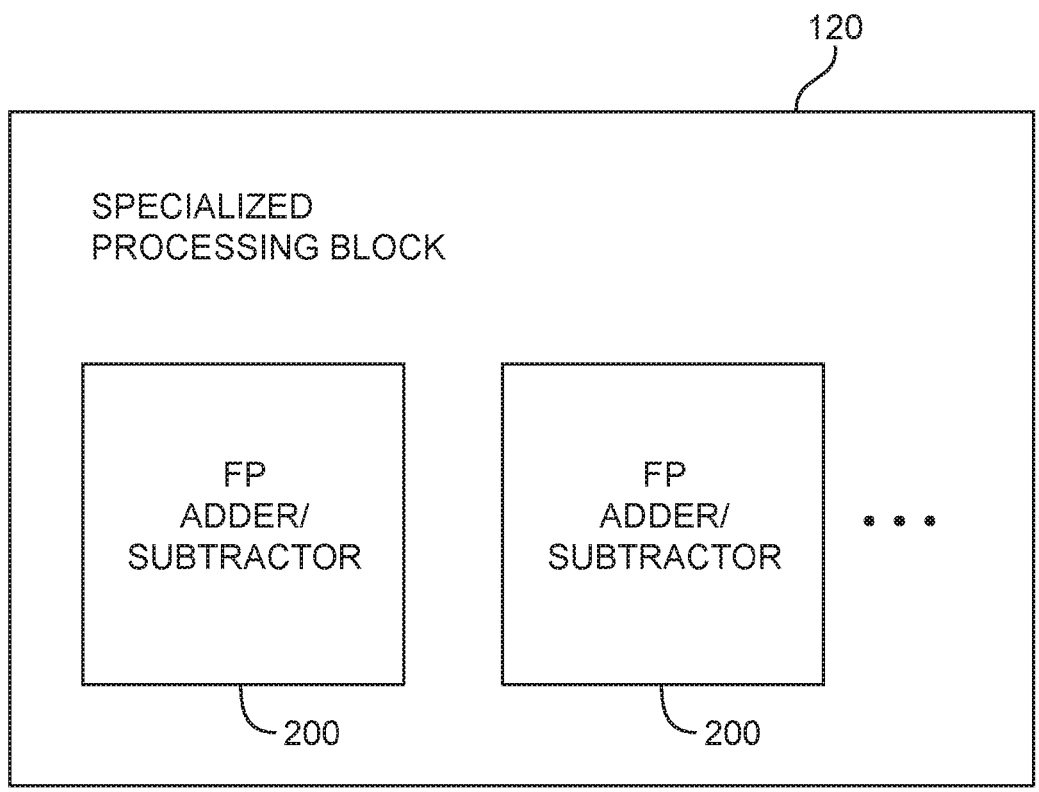
FIG. 2 is a diagram showing how a specialized processing block may include one or more floating-point adder circuits in accordance with an embodiment.

FIG. 2 is a diagram showing how a specialized processing block may include two or more floating-point (FP) adding/subtraction circuits in accordance with an embodiment. As shown in FIG. 2, specialized processing block (sometimes referred to as a digital signal processing block or "DSP" block) may include one or more floating-point adder/subtractor circuits 200.

Floating-point numbers are commonplace for representing real numbers in scientific notation in computing systems and are designed to cover a large numeric range and diverse precision requirements. The IEEE 754 standard is commonly used for floating-point numbers. A floating-point number includes three different parts: (1) the sign of the floating-point number, (2) the mantissa, and (3) the exponent. Each of these parts may be represented by a binary number and, in the IEEE 754 format, have different bit sizes depending on the precision. For example, a single precision floating-point number requires 32 bits, which are distributed as follows: one sign bit (bit 32), eight exponent bits (bits [31:24]), and 23 mantissa bits (bits [23:1]). A double precision floating-point number requires 64 bits including one sign bit (bit 64), 11 exponent bits (bits [63:53]), and 52 mantissa bits (bits [52:1]).

The sign of a floating-point number according to standard IEEE 754 is represented using a single bit, where a "0" denotes a positive number and a "1" denotes a negative number. As IEEE 754 floating-point numbers are defined in this signed magnitude format, additional and subtraction operations are essentially the same, so only an adder may be referred to below to simplify the discussion.

The exponent of a floating-point number preferably is an unsigned binary number which, for the single precision format, ranges from 0 to 255. In order to represent a very small number, it is necessary to use negative exponents. Thus, the exponent preferably has a negative bias. For single precision floating-point numbers, the bias preferably is −127. For example a value of 140 for the exponent actually represents (140−127)=13, and a value of 100 represents (100−127)=−27. For double precision numbers, the exponent bias preferably is −1023.

As discussed above, according to the IEEE 754 standard, the mantissa is a normalized number (i.e., it has no leading zeroes and represents the precision component of a floating point number). Because the mantissa is stored in binary format, the leading bit can either be a 0 or a 1, but for a normalized number it will always be a 1. Therefore, in a system where numbers are always normalized, the leading bit need not be stored and can be implied, effectively giving the mantissa one extra bit of precision. Thus, the single precision format effectively has 24 bits of precision (i.e., 23 mantissa bits plus one implied bit).

Figure 3:
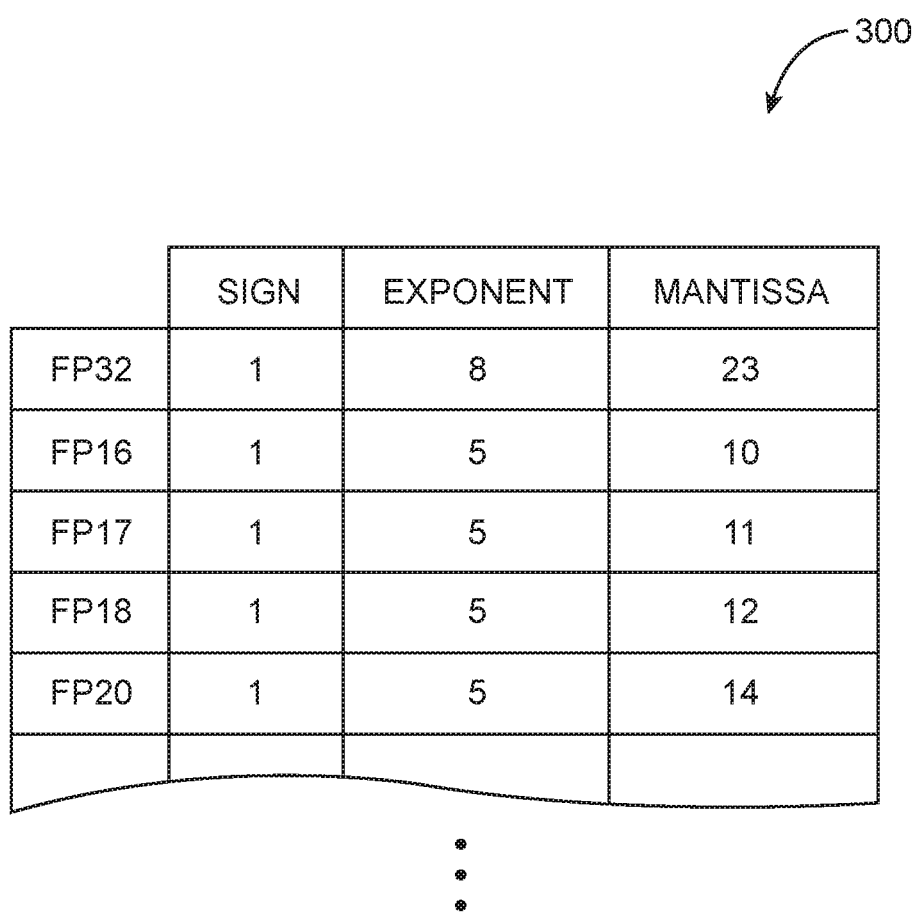
FIG. 3 is a diagram showing different precisions that can be supported using the adder circuit of FIG. 2 in accordance with an embodiment.

The single precision floating point arithmetic as defined by the IEEE 754 standard may be referred to as "FP32," since the single precision floating-point number requires 32 bits (see, e.g., the first row in table 300 of FIG. 3). For certain applications, it may be desirable to support "FP16" arithmetic, which involves floating-point numbers with one sign bit, five exponent bits, and ten mantissa bits. Including the implied leading bit, FP16 effectively has an 11-bit mantissa.

Typically, conventional programmable logic devices only include float-point adders with fixed precisions. Implementing variable precision floating-point arithmetic circuits may be prohibitively expensive since support of different precisions may require significant area overhead. It would therefore be desirable to implement multi-precision floating-point adder circuits without incurring significant area penalties.

In accordance with an embodiment, adders 200 may not only be configured to support FP32 and FP16, but may also be configured to support a wide range of intermediate sizes such as FP17, FP18, FP20, etc., without incurring large area penalties. Configured in this way, DSP 120 can support up to twice the functional density relative to FP32 operations. As shown in FIG. 3, FP17 may involve floating-point numbers with one sign bit, five exponent bits, and 11 mantissa bits; FP18 may involve floating-point numbers with one sign bit, five exponent bits, and 12 mantissa bits; and FP20 may involve floating-point numbers with one sign bit, five exponent bits, and 14 mantissa bits (as examples).

The number of bits allocated to the exponent and mantissa portions as shown in table 300 is merely illustrative and does not serve to limit the present embodiments. If desired, the exponent for each of the various floating-point formats may be more or less than five bits, and the number of mantissa bits may be adjusted based on the exponent.

Figure 4:
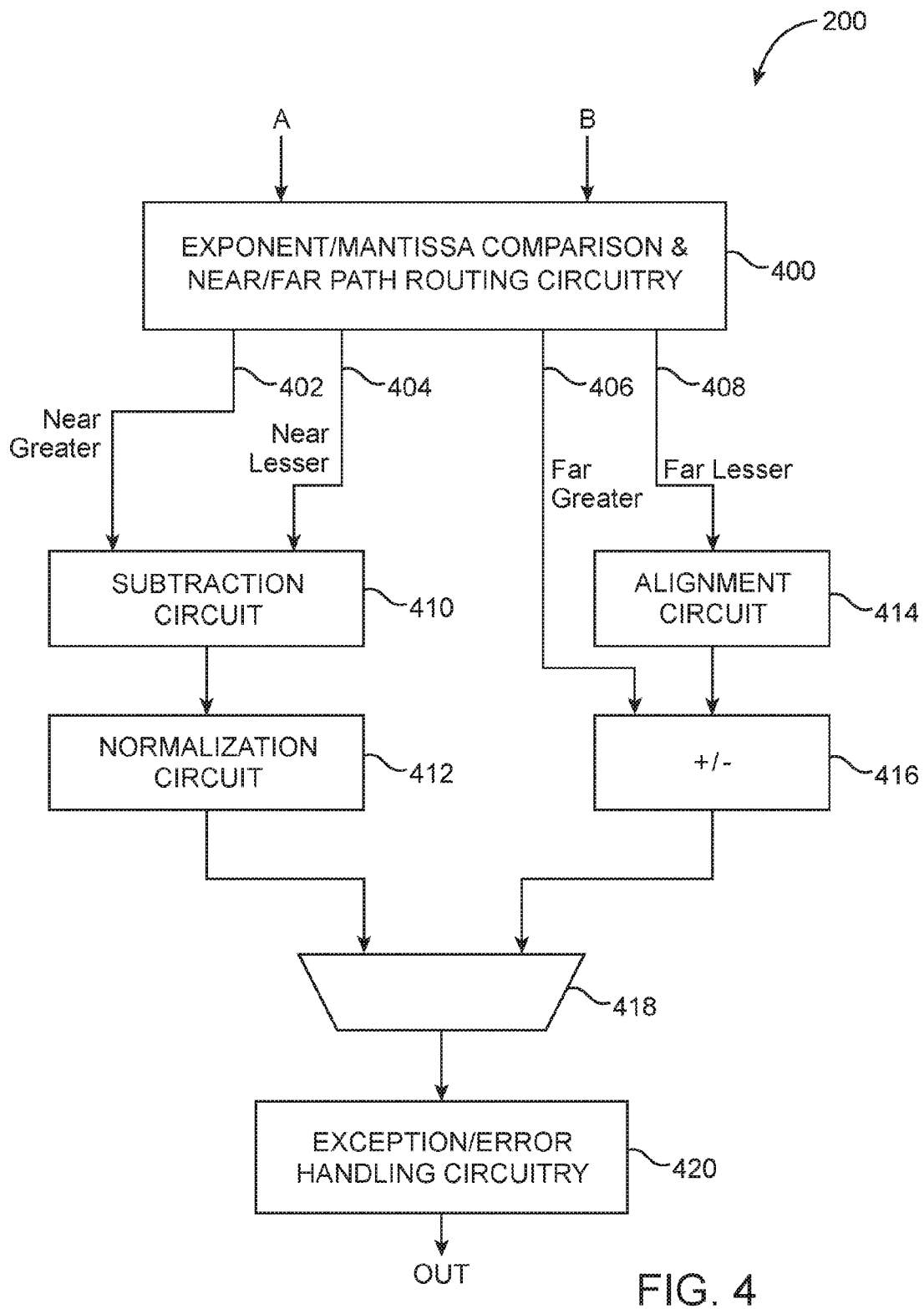
FIG. 4 is a diagram of an illustrative dual path floating-point adder circuit in accordance with an embodiment.

FIG. 4 is a diagram showing one suitable implementation of adder circuit 200 that is capable of supporting variable precisions. As shown in FIG. 4, adder 200 may include exponent/mantissa comparison and near/far path routing circuitry 400 that receives inputs A and B (i.e., the exponents and mantissa of numbers A and B), compares the exponents and also mantissas of inputs A and B, and splits the numbers into a "near" path and a "far" path. If the difference of the exponents is equal to zero or one, then the near path may be used (where the value of "1" is set as the predetermined threshold value). In the near path, typically only subtraction occurs. The larger number, which could be either A or B, will be routed to the "near greater" path 402, whereas the smaller number will be routed to the "near lesser" path 404. On the other hand, if the difference of the exponents is greater than one or for a true addition operation, then far path may be taken (e.g., the far path may handle addition for the near values as well). The larger number, which could be either A or B, will be routed to the "far greater" path 406, whereas the smaller number will be routed to the "far lesser" path 408. The exemplary architecture of FIG. 4 in which the values are split into near and far paths may sometimes be referred to as a "dual path" adder architecture.

To illustrate the operation of the near path, consider an example where A is equal to 1124*exp(15) and where B is equal to −1924*exp(14). In the example above, number A has a significand that is equal to 1124 and an exponent of base two. In order to match the exponents, B may be right-shifted by one position (i.e., to divide B by a factor of 2 since the exponent is base two, which yields −962). Since B is negative, the magnitude of B may then be subtracted from A, which then yields 162 (i.e., 1124 minus 962), with a corresponding exponent of 15. To normalize 162, the number of leading zeros may be determined and then left shifted by the appropriate number of bits. In this particular scenario, the result may be equal to 1296*exp(12) (i.e., 162 may be left-shifted by 3 bit positions, effectively multiplying 162 by a factor of 8 to yield 1296).

As shown in the example above, the near path may involve a subtraction operation (which can be performed using subtraction circuit 410 of FIG. 4) and a normalization operation (which can be performed using normalization circuit 412). While the right shift operation of the near lesser number might be trivial, implementation of subtraction circuit 410 and normalization circuit 412 can be fairly complex.

To illustrate the operation of the far path, consider an example where A is equal to 1524*exp(15) and where B is equal to −1424*exp(12). In order to match the exponents, B may be right-shifted by three bit positions (i.e., to divide B by 8 since the exponent is base two, which yields −178). Since B is negative, the magnitude of B may then be subtracted from A, which then yields 1346 (i.e., 1524 minus 178), with a corresponding exponent of 15. Since A is at least several orders of magnitude larger than B, the resulting number can be expressed in base two without a complicated count-zero/normalization process.

As shown in the example above, the far path may involve right shifting the far less number (which can be performed using alignment circuit 414) and an addition/subtraction operation (which can be performed using circuit 416). While the normalization operation at the output of circuit 416 might be trivial, implementation of alignment circuit 414 and arithmetic circuit 416 can be fairly complex.

Still referring to FIG. 4, floating-point adder circuit 200 may also include a multiplexing circuit such as multiplexer 418 having a first data input that receives an output signal from normalization circuit 412 in the near far, a second data input that receives an output signal from +/− circuit 416 in the far path, and an output at which either the near path result or the far path result may be routed. The output of multiplexer 418 may then be fed through exception/error handling circuitry 420 to produce final output signal OUT.

Figure 5:
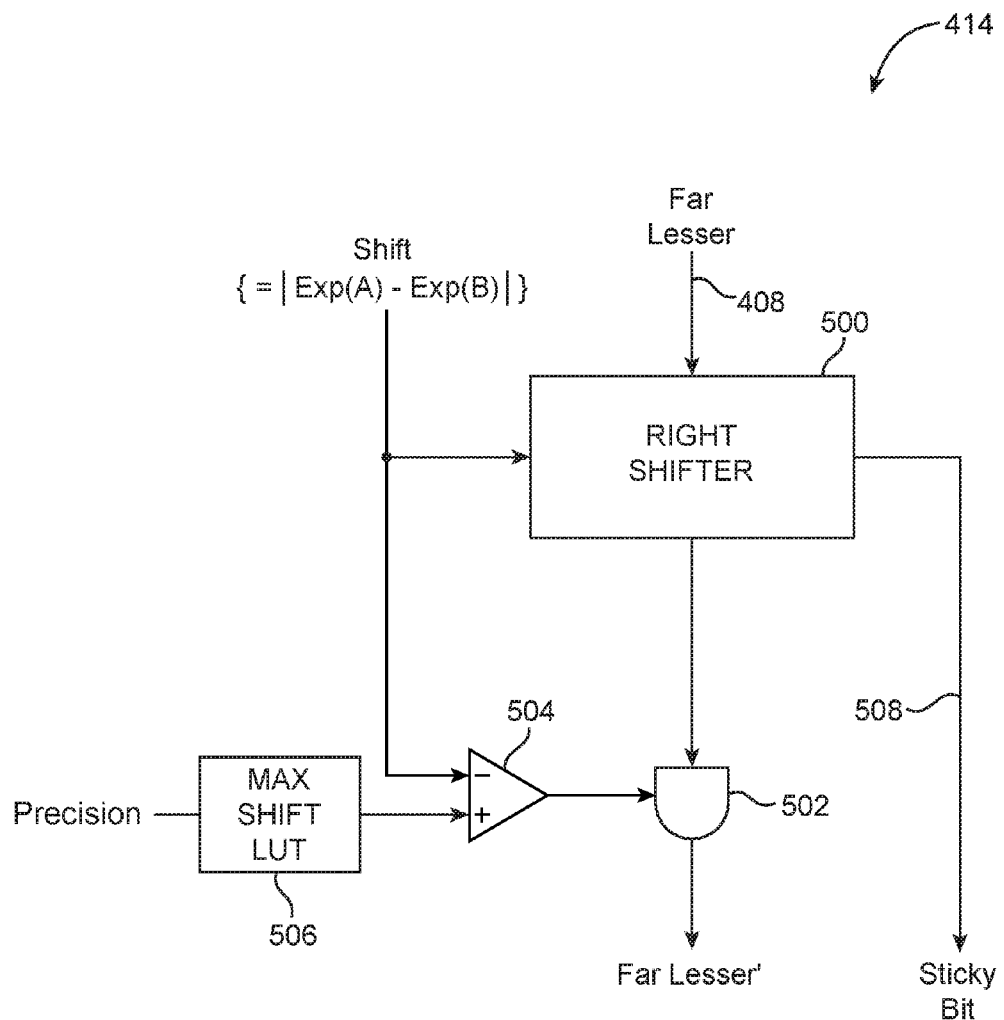
FIG. 5 is a diagram of an illustrative far path alignment circuit in accordance with an embodiment.

FIG. 5 is a diagram of far path mantissa alignment circuit 414 in accordance with an embodiment. Alignment circuit 414 serves to denormalize the far lesser mantissa. As shown in FIG. 5, alignment circuit 414 may include a right shifter block 500, a maximum shift lookup table (LUT) circuit such as max shift LUT 506, a comparison circuit such as comparator 505, and a gating circuit such as logic AND gate 502. Right shifter block 500 may receive a mantissa value from far lesser path 408 and a multibit shift value, which is equal to the difference in the exponents of inputs A and B, and may output a corresponding shifted value to gate 502 and also a sticky bit at output 508.

As described above, floating-point adder 200 of FIG. 4 may be configured to support multiple mantissa widths (e.g., to support a variable number of precisions). For each mantissa width supported by floating-point adder 200, a maximum amount of shift is allowed. In the case of a 10-bit mantissa, the corresponding maximum shift would be 13 bits (i.e., an 11-bit input including the implied leading "1" and the guard and round bits). As another example, if the mantissa is 6 bits, the corresponding maximum shift would be 9 bits (i.e., a 7-bit input including the implied leading "1" and the guard and round bits). As yet another example, if the mantissa includes 23 bits, the corresponding maximum shift would be 26 bits (i.e., a 24-bit input including the implied leading "1" and the guard and round bits). In other words, the maximum shift value should be three more than the current precision being supported. This mapping may be encoded within maximum shift LUT circuit 506. If desired, circuit 506 may also be implemented using read-only memory (ROM) or other types of statically configured logic gates.

The shift value may be compared to the maximum allowed shift output using comparator 504. If the input shift value exceeds the maximum shift value, comparator 504 will output a low value, which will cause gate 502 to output a zeroed value (i.e., the far lesser' output will be completely zeroed out). If the input shift value is equal to or less than the maximum shift value, comparator 504 will output a high value, which will allow gating circuit 502 to pass through the shifted value at the output of right shifter block 500. The example of FIG. 5 in which comparison circuit 504 is implemented as a comparator is merely illustrative. If desired, comparison circuit 504 may also be implemented as a subtraction circuit or other threshold determination circuit. The sticky bit should not be affected by the maximum shift comparison result.

Figure 6:
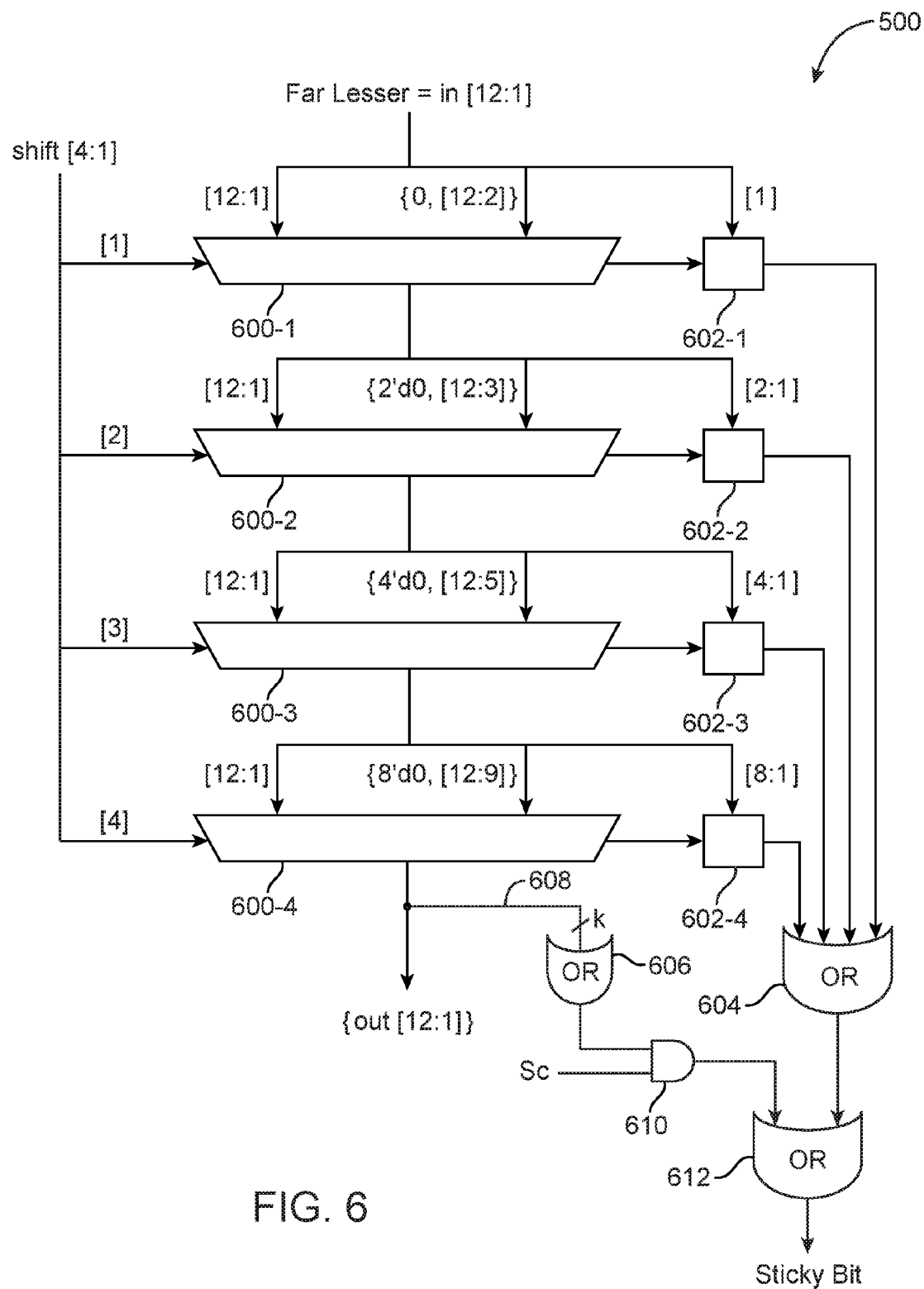
FIG. 6 is a circuit diagram of an illustrative right shifter circuit that may be included within the alignment circuit shown in FIG. 5 in accordance with an embodiment.

FIG. 6 is a circuit diagram of right shifter block 500 that may be included within alignment circuit 414 of the type described in connection with FIG. 5. As shown in FIG. 6, right shifter 500 may include multiplexing stages 600-1, 600-2, 600-3, and 600-4. Right shifter 500 may receive a far lesser mantissa input, which is equal to a 12-bit input value in[12:1] in this particular example, and may also receive a 4-bit shift value. The least significant bit (LSB) of the received shift signal may control multiplexer stage 600-1, which selectively right shifts the input value by one bit position, setting the most significant bit (MSB) to zero. The second LSB of the shift signal (i.e., shift[2]) may be used to control multiplexer stage 600-2, which selectively right shifts the input value by two bit positions, setting the two MSBs to zero. Similarly, the third LSB of the shift signal (i.e., shift[3]) may be used to control multiplexer stage 600-3, which selectively shifts the input value four bit positions to the right while setting the four MSBs to zero. Lastly, the MSB of the shift signal (i.e., shift[4]) may be used to control multiplexer stage 600-4, which selectively shifts the input value eight bit positions to the right while setting the eight leading bits to zero. Configured in this way, the four-stage right shifter block of FIG. 6 can support any amount of right shifting between no shifting and a 15-bit right shift (if all four shift control bits are asserted).

In floating-point calculations, a "sticky bit" will also need to be computed. The sticky bit indicates whether a high bit was shifted to the right of the word width of the input number and is therefore lost. Blocks 602-1, 602-2, 602-3, and 602-4 may receive the shifted bits and may be used to calculate the sticky bit contribution for each level by ORing together any bits that would have been shifted to the right of the data path. All of these signals may be ORed together using logic OR gate 604 to generate help a sticky bit for the far path.

The size of right shifter block 500 may be set depending on the largest mantissa precision that needs to be supported by floating-point adder 200 (FIG. 4). Here, the 12-bit wide shifter 500 of FIG. 5 will support up to a mantissa precision of 9 bits, which translates to a number with 10-bit precision if taking into account the leading "1" and also two additional bits for the ground and round bits. As described above, the sticky bit is one bit position to the right of the rounding bit and can be used to make rounding decisions, such as in the case of a round-to-nearest-even (RNE) operation.

To help support smaller mantissas, the sticky bit will need to include bits shifted to the right of the smaller mantissa. These bits can be taken from the last multiplexing stage such as stage 600-4 in the example of FIG. 5, as indicated by LSB routing path 608. In the case where the smaller mantissa would be 6 bits, the three LSBs of the last stage (e.g., 9 bits minus 6 bits) would also form part of the smaller sticky bit. These three bits would be ORed together by gate 606. An additional logic AND gate 610 would be used to selectively include these in the final sticky bit, which is computed by ORing together the sticky bit output from OR gate 604 and the additional sticky bit component from OR gate 606 using final logic OR gate 612. In other words, control signal Sc may be deasserted (i.e., driven low) in the 9-bit mantissa mode or may be asserted (i.e., driven high) in the 6-bit mantissa mode, where k is equal to three.

This example in which two different mantissa widths are supported is merely illustrative and is not intended to limit the scope of the present embodiments. If desired, three or more different floating-point precisions can be supported in this way. An additional OR gate 606 will combine bits to the left (more significant than those from gate 606) and can be selectively ORed with the components of the larger sticky bits. In other words, an additional OR gate that receives the fourth and fifth bit from the last stage may be cascaded with logic gate 606 and may be selectively combined using an additional logic AND gate to help support a mantissa width of 4 bits.

The methods described herein may require all input mantissas to be aligned at the MSB (e.g., all mantissas should be left justified). Operated in this way, the guard and round bits will then be implied to be the immediate right of the LSB of the respective mantissas. Similarly, the sticky bit for all mantissa cases will at the same position (e.g., to the right of the LSB of the largest number). In other words, numbers with smaller mantissas will still be left justified but there will be at least some don't care bits between its LSB and the actual sticky bit, which is right justified according to the size of the largest mantissa (e.g., the mantissas are left justified, whereas the stick bit is right justified).

Figure 7:
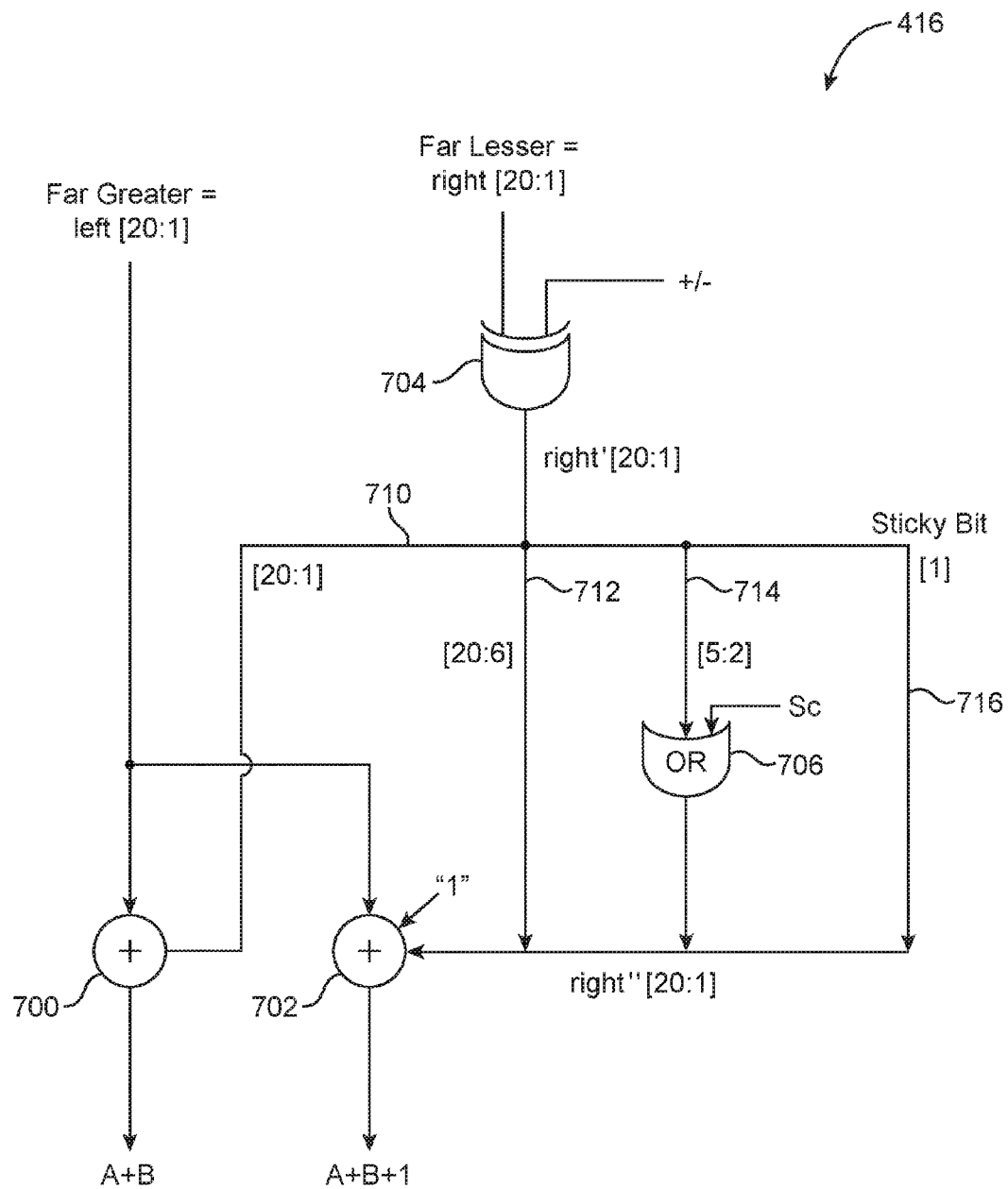
FIG. 7 is a circuit diagram of an illustrative far path adder circuit in accordance with an embodiment.

FIG. 7 is a circuit diagram showing one suitable implementation of far path adder/subtractor circuit 416 in accordance with an embodiment. As shown in FIG. 7, circuit 416 may include a first summing circuit 700, a second summing circuit 702, a bit-wise logic exclusive-OR (XOR) gate 704, and a bit-wise logic OR gate 706. Circuit 416 may be configured to allow for correct rounding with left-justified mantissas and right-justified sticky bits, requiring no alignment shifting before and after the addition/subtraction. In the example of FIG. 7, circuit 416 receives a 20-bit input word, which supports a 14-bit mantissa, a leading "1", two leading zeroes to allow for additional word growth in an unsigned representation, and three trailing bits (i.e., a guard bit, a round bit, and a sticky bit).

Circuit 416 receives a first input signal left[20:1] from the far greater path and a second input signal right[20:1] from the far lesser path. The far less input signal right[20:1] may be selectively complemented using bit-wise XOR gate 704. For example, each bit in signal right[20:1] may be selectively inverted using gate 704 during a true subtraction operation when the right input of XOR gate 704 is asserted. In accordance with at least some embodiments, the subtraction operation, which is a function of the operation and the sign of the input operands, is performed using a two's complement operation. To convert a number into its two's complement, the number may be inverted and incremented by "1." Whether or not signal right[20:1] has been altered by gate 704, the value at the output of gate 704 may be represented as signal right'[20:1].

In the simplest scenario, the far greater input signal left[20:1] and the far lesser input signal right'[20:1] would be added together via path 710 using summing circuit 700 to produce A+B or added together using summing circuit 702 with an additional "+1" to produce A+B+1. The additional "1" input may be implemented as a high carry-in bit. In particular, the A+B+1 result of summing circuit 702 may be selected in the case of a subtraction operation or in the case of an addition operation that is rounded up. The 14-bit mantissa example described above may be capable of supporting FP20 addition/subtracting operations (see, e.g., FIG. 3). In this mode, logic OR gate 706 may receive a deasserted control signal Sc (i.e., signal Sc may be driven low) so that signal right"[20:1] received at the immediate input of summer 702 is simply a concatenation of: (1) signal right'[20:6] via path 712, (2) a simple pass-through of right'[5:2] via path 714, and (3) the LSB of right'[20:1] via path 716, which serves as the dedicated sticky bit.

When supporting a smaller mantissa such as a 10-bit mantissa (see, e.g., FP16 in FIG. 3), there will be four (i.e., 14 minus 10) don't-care bits between the left-justified 10-bit mantissa and the right-justified sticky bit. In this mode, control signal Sc may be asserted (i.e., signal Sc may be driven high) so that signal right"[20:1] received at the immediate input of summer 702 will be a concatenation of: (1) signal right'[20:6] via path 712, (2) bits "1111" via path 714, and (3) the computed sticky bit. In other words, signal right"[20:1] may include: leading zero bits "00," followed by a leading "1," followed by the 10-bit mantissa, a guard bit, a round bit, four don't-care bits (which will be forced high), and the sticky bit. While the sticky bit is explicitly calculated and is in the same position as before, the guard and round bits are not explicitly calculated.

As shown in this example, when a smaller mantissa is being supported, the difference in precision between the larger mantissa and the smaller mantissa may be ORed high using gate 706. Doing so has the effect of propagating the additional "1" of summer 702 through to the LSB of the smaller mantissa. If desired, this technique may be extended to support more than two different precisions. To support additional smaller mantissa sizes, additional logic OR gate(s) 706 may be added to further propagate the carry-in "1" bit further up summer 702.

Figure 8:
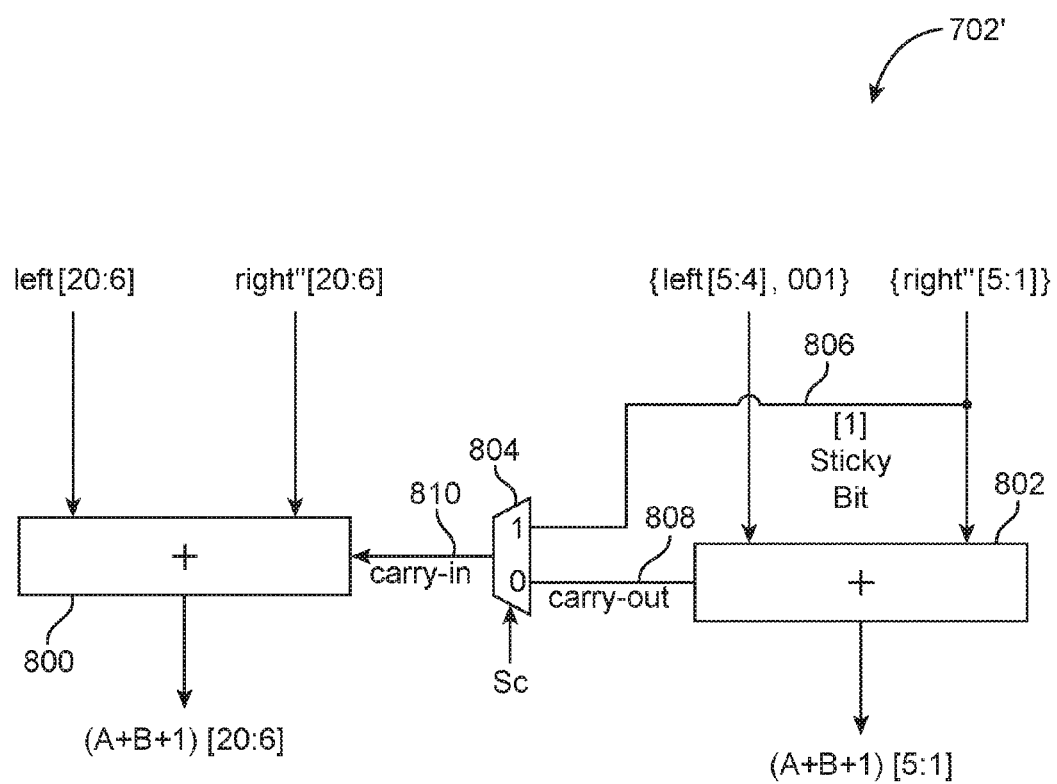
FIG. 8 is a diagram of an illustrative logic circuit for generating an incremented sum output in accordance with an embodiment.

Although summing circuits 700 and 702 are shown as separate structures, other structures and methods such as flagged prefix adders or compound adders may be used (as examples). The exemplary arrangement as shown in FIG. 7 for computing A+B+1 for at least two different mantissa widths is merely illustrative. FIG. 8 shows another suitable arrangement for calculating A+B+1 by bypassing the don't-care bits. As shown in FIG. 8, summing circuit 702' may be split into two sections: (1) a first summing section 800 and (2) a second summing section 802. First summing section 800 receives signals left[20:6] and right"[20:6] and outputs (A+B+1) [20:6]. Second summing section 802 receives signals {left[5:4], "001"} and right"[5:1] and outputs (A+B+1) [5:1]. Here, the +1 to the LSB is implemented by replacing the three LSBs of left[5:1] with "001," rather than using the carry-in port.

Summing circuit 702' may also include a multiplexer 804 having a first input that is coupled to the carry-out port 808 of summing section 802, a second input that receives the sticky bit from the right" LSB path 806, a control input that receives control signal Sc, and an output that feeds the carry-in port 810 of summing section 800. Configured in this way, the carry-out from summing section 802 is routed to the carry-in of summing section 800 when supporting the larger mantissa width of 14 bits (e.g., in a first mode when signal Sc is driven low), whereas the sticky bit is fed to the carry-in of summing section 800 via path 806 when supporting the smaller mantissa width of 10 bits (e.g., in a second mode when signal Sc is driven high). The sticky bit should always be the LSB of signal right". Directly feeding the sticky bit to summing section 800 in this way provides the same functionality as rippling through a "1" from the LSB to the desired bit position.

Figure 9:
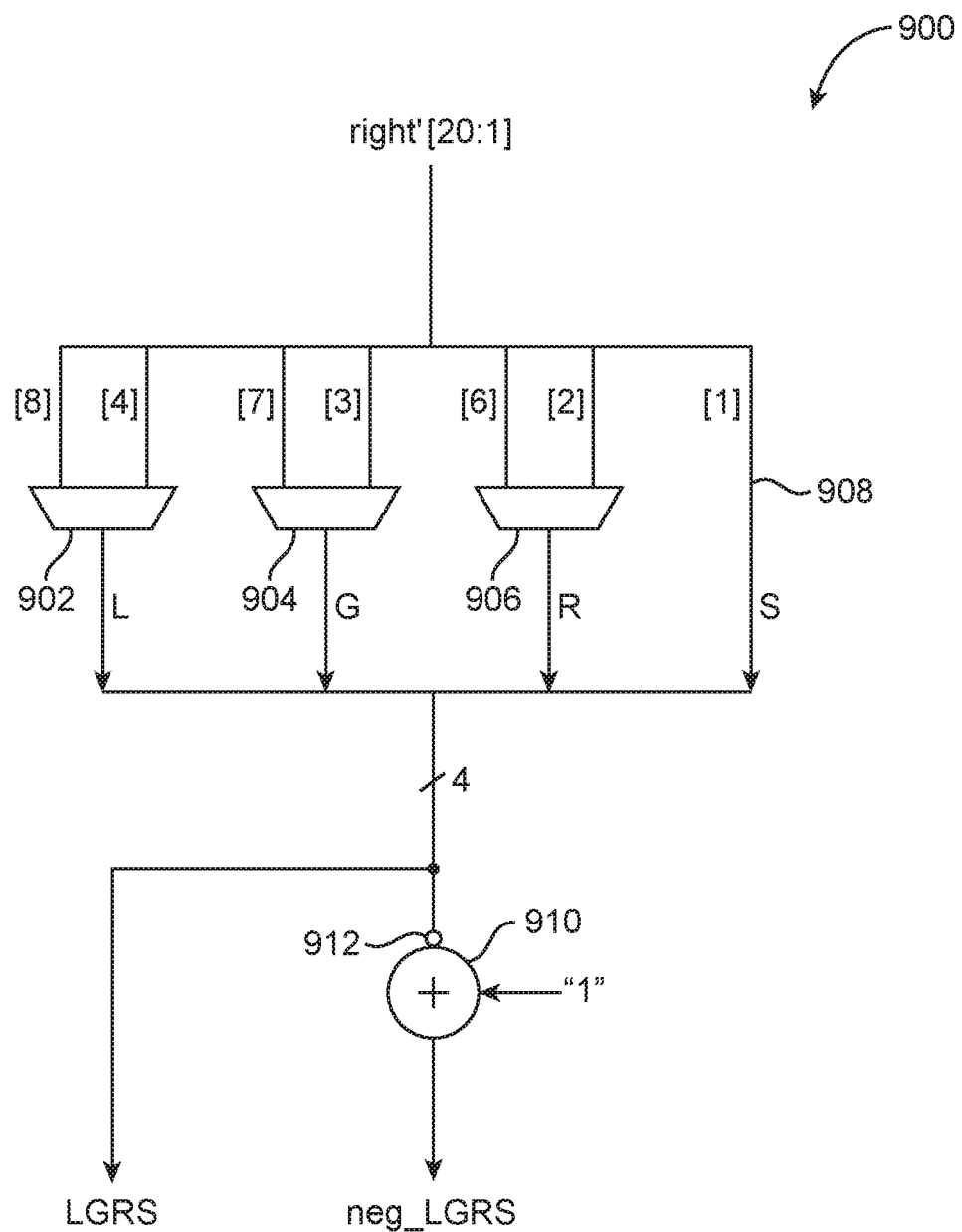
FIG. 9 is a circuit diagram showing how LGRS bits may be generated in accordance with an embodiment.

FIG. 9 is a circuit diagram showing how the LSB-guard-rounding-sticky (LGRS) bits may be generated using LSB selection circuit 900 in accordance with an embodiment. The sticky bit is always the same for all mantissa precisions, which is always set to the right'[1] bit, as indicated by LSB path 908. The current mantissa LSB (L), guard (G) bit and rounding (R) bit may be multiplexed from their respective positions using multiplexers 902, 904, and 906, respectively. For example, the LGR bits may be set equal to right'[4:2] when supporting FP20 (or any other FP arithmetic with a mantissa width of 14 bits) or may be set to right'[8:6] when supporting FP16 (or any other FP arithmetic with a mantissa width of 10 bits). The four-bit LGRS signal may be used for rounding purposes. This approach may be further extended to support yet other mantissa widths by adding additional multiplexing capability to select LGR bits from other bit positions.

Still referring to FIG. 9, LSB selection circuit 900 may also include summing circuit 910 that receives an inverted version of the LGRS bits at inverting port 912 and a "1," thereby outputting a negative version of the LGRS bits (neg_LGRS). Signal neg_LGRS may be equal to the two's complement version of the original LGRS bits.

As described previously, the mantissas are left justified. The three MSB bits of the mantissa, which are always in the same location since the mantissas are left justified, will have to be tested to check if the range is greater than or equal to two, less than two, greater than or equal to one, or less than one. Thus, the only logic that is required to process the MSBs is a two-bit N:1 multiplexer (where N is the total number of unique mantissa precisions) and M logic OR gates (where M is equal to the difference in precision between the largest and smallest mantissas). This method of aligning the mantissas on the MSB means that the near path is identical in all cases, so the near path does not require any muxing to position the mantissa before, during, or after the near path calculation.

Figure 10A:
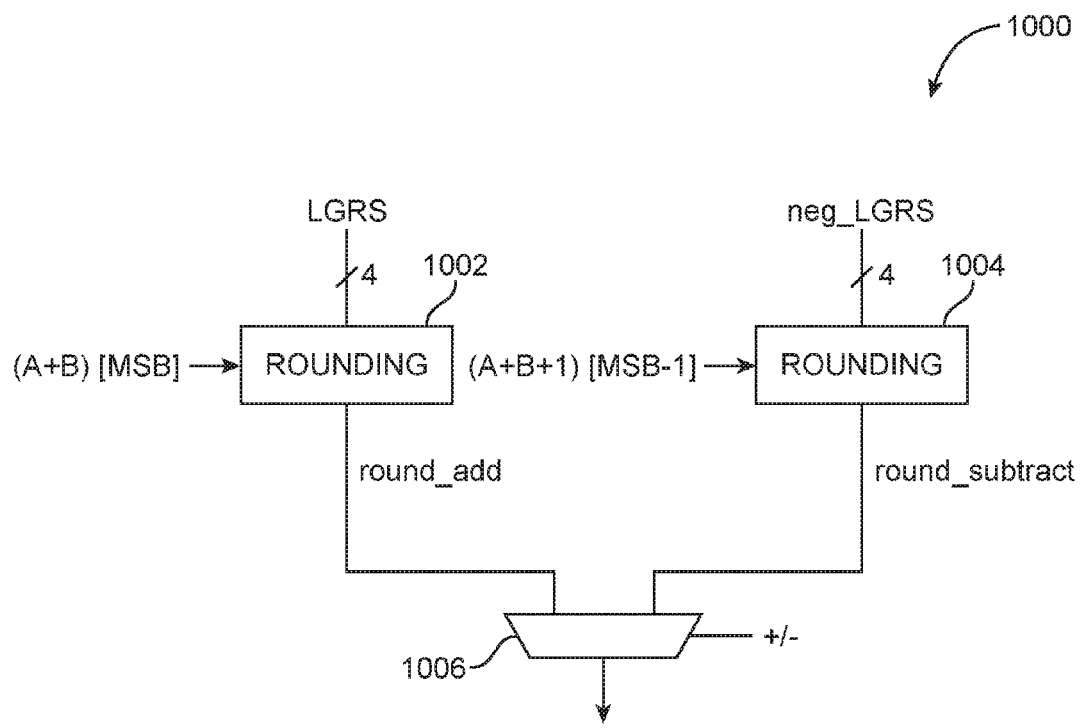
FIG. 10A is a diagram of an illustrative rounding determination circuit in accordance with an embodiment.

FIG. 10A is a diagram showing how rounding decisions are made. As shown in FIG. 10A, circuitry 1000 may include a first rounding determination circuit 1002 and a second rounding determination circuit 1004. First rounding determination circuit 1002 may receive the LGRS bits (e.g., the four bits output from LSB selection circuit 900 of FIG. 9) and the MSB of A+B to output a first rounding control signal round_add. Second rounding determination circuit 1004 may receive the negative LGRS bits neg_LGRS and the second MSB of A+B+1 to output a second rounding control signal round_subtract. A rounded mantissa result is only taken from A+B+1. In the case of an addition operation, the polarity of signal round_add will determine whether the result is unrounded (from A+B) or rounded (A+B+1). In the case of a subtraction operation, the polarity of signal round_subtract will determine whether the result is unrounded (from A+B) or rounded (A+B+1). Multiplexer 1006 will selectively output one of signals round_add and round_subtract to its output depending on whether the current operation is an addition or a subtraction.

Figure 10B:
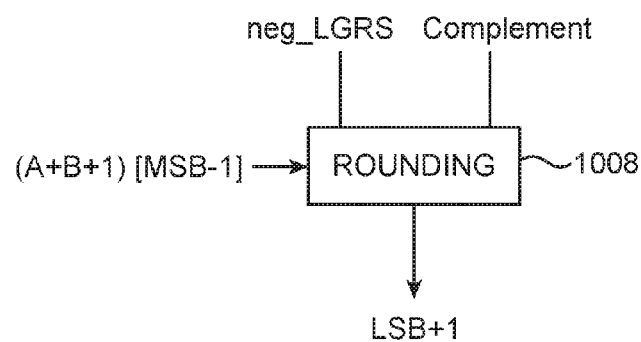
FIG. 10B is a diagram of an illustrative LSB flip determination circuit in accordance with an embodiment.

There is also a special case for subtraction rounding, which only affects the LSB of the result. FIG. 10B is a diagram of an illustrative LSB flip determination circuit 1008 in accordance with an embodiment. As shown in FIG. 10B, the subtraction rounding may be based on the second MSB of A+B+1, signal neg_LGRS, and a complement signal. If the corresponding output is high, the LSB may be flipped and a two's complement representation may be used. If the corresponding output is low, the LSB may remain unchanged.

Figure 11:
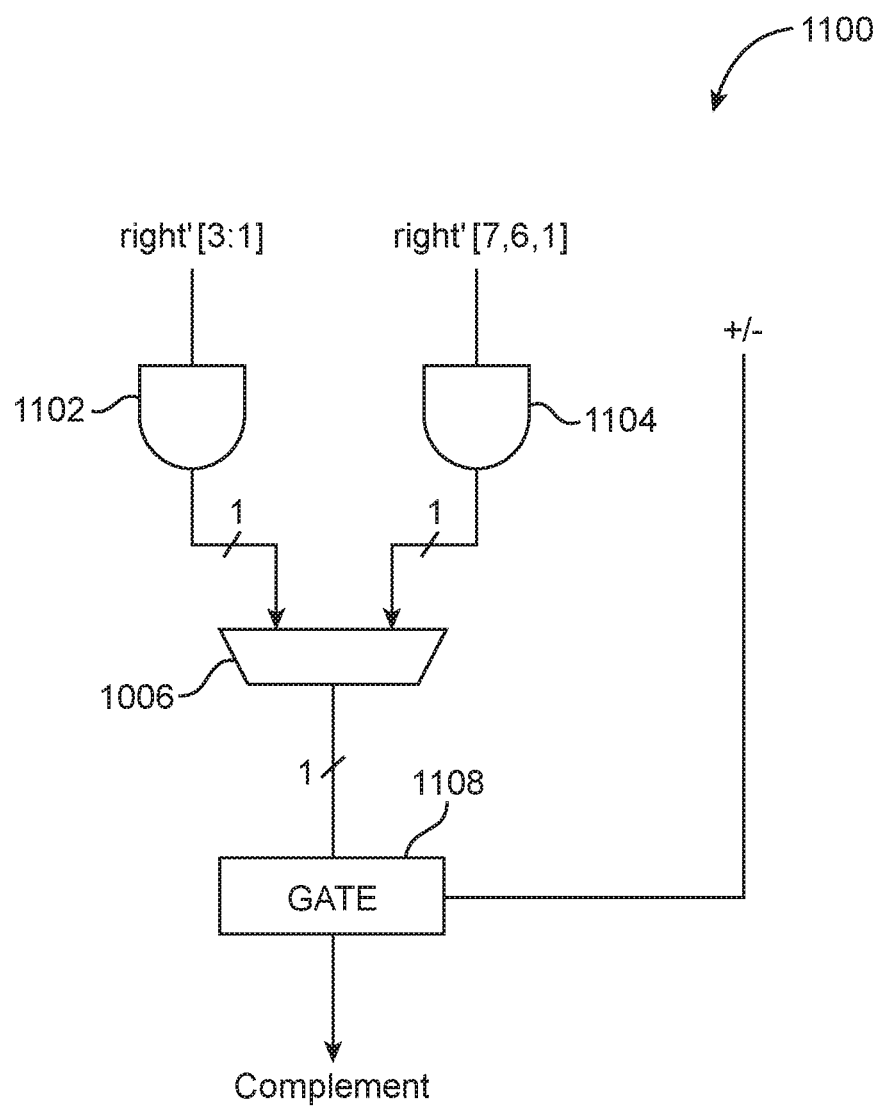
FIG. 11 is diagram of an illustrative complement signal generation circuit in accordance with an embodiment.

FIG. 11 is diagram of an illustrative complement signal generation circuit 1100 in accordance with an embodiment. As shown in FIG. 11, circuit 1100 may include a first logic AND gate 1102, a second logic AND gate 1104, a multiplexing circuit 1106, and a logic gate 1108. Gate 1102 may be used to AND together the right'[3:1] bits when supporting FP20 (or any other FP arithmetic with a mantissa width of 14 bits), whereas gate 1104 may be used to AND together the right'[7,6,1] bits when supporting FP16 (or any other FP arithmetic with a mantissa width of 10 bits). Depending on which mode is currently being supported, multiplexer 1106 may forward one of the ANDed outputs to gate 1108. Gate 1108 may also receive a sign component. Depending on the output of multiplexer 1106 and the polarity of the sign component, the final complement control signal may be selectively asserted (to indicate a two's complement representation) or deasserted (to indicate that a normal positive number is present). The configuration of FIG. 11 in which circuit 1100 includes only two different AND gates to support FP20 and FP16 is merely illustrative. If desired, additional logic AND gates may be added and large multiplexer 1106 may be used to support three or more mantissa widths, four or more mantissa widths, five or more mantissa widths, etc.

The embodiments of FIGS. 9-11 are not mutually exclusive with the embodiments of FIGS. 5-8. In fact, the circuitry shown in FIGS. 5-11 may all be included in a single embodiment of a multi-precision floating-point adder.

The embodiments thus far have been described with respect to integrated circuits. The methods and apparatuses described herein may be incorporated into any suitable circuit. For example, they may be incorporated into numerous types of devices such as programmable logic devices, application specific standard products (ASSPs), and application specific integrated circuits (ASICs). Examples of programmable logic devices include programmable arrays logic (PALs), programmable logic arrays (PLAs), field programmable logic arrays (FPGAs), electrically programmable logic devices (EPLDs), electrically erasable programmable logic devices (EEPLDs), logic cell arrays (LCAs), complex programmable logic devices (CPLDs), and field programmable gate arrays (FPGAs), just to name a few.

The programmable logic device described in one or more embodiments herein may be part of a data processing system that includes one or more of the following components: a processor; memory; IO circuitry; and peripheral devices. The data processing can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system. In one embodiment, the programmable logic device may be one of the family of devices owned by ALTERA/INTEL Corporation.

The foregoing is merely illustrative of the principles of this invention and various modifications can be made by those skilled in the art. The foregoing embodiments may be implemented individually or in any combination.

What is claimed is:

1. An integrated circuit, comprising:
a floating-point adder that receives first and second numbers, each having a mantissa and an exponent, wherein the floating-point adder comprises:
a mantissa alignment circuit;
an addition circuit, wherein the mantissa alignment circuit and the addition circuit are operable in a first mode that supports a first mantissa size and are also operable in a second mode that supports a second mantissa size that is different than the first mantissa size;
a subtraction circuit;
a normalization circuit, wherein the subtraction circuit and the normalization circuit are also operable in the first and second modes; and
a multiplexer configured to receive far path signals from the addition circuit and to receive near path signals from the normalization circuit in the first and second modes.

2. The integrated circuit of claim 1, wherein the mantissa alignment circuit comprises a right shifter that generates a shifted mantissa.

3. The integrated circuit of claim 2, wherein the mantissa alignment circuit further comprises a gating circuit that selectively passes through the shifted mantissa.

4. The integrated circuit of claim 3, wherein the mantissa alignment circuit further comprises a comparison circuit that controls the gating circuit, and wherein the comparison circuit selectively directs the gating circuit to output only zero bits.

5. The integrated circuit of claim 4, wherein the mantissa alignment circuit further comprises a maximum shift lookup table (LUT) circuit that outputs a maximum shift value depending on the size of the mantissas of the first and second numbers, and wherein the comparison circuit compares the maximum shift value to the difference in the exponents.

6. The integrated circuit of claim 5, wherein the maximum shift LUT circuit outputs a first maximum shift value during the first mode and outputs a second maximum shift value that is different than the first maximum shift value during the second mode.

7. The integrated circuit of claim 2, wherein the right shifter includes:
a chain of multiplexing stages;
a first logic OR gate that is coupled to each multiplexing stage in the chain and that generates a first output signal; and
a second logic OR gate that receives at least some least significant bits from a last multiplexing stage in the chain and that generates a second output signal, wherein second output signal is selectively combined with the first output signal only during the second mode.

8. The integrated circuit of claim 1, wherein the addition circuit comprises:
a first summing circuit that outputs a sum;
a second summing circuit that outputs an incremented sum; and
a logic OR gate that feeds the second summing circuit and that receives a deasserted control signal during the first mode and an asserted control signal during the second mode.

9. The integrated circuit of claim 8, wherein the second summing circuit has a carry-in port that receives a logic "1".

10. The integrated circuit of claim 1, wherein the addition circuit comprises:
a first summing circuit that outputs a sum; and
a second summing circuit that outputs an incremented sum, wherein the second summing circuit includes:
a first summing segment;
a second summing segment; and
a multiplexing circuit that receives a carry-out signal from the second summing segment and that selectively routes a selected one of the carry-output signal and a sticky bit to a carry-in port of the first summing segment.

11. A method of operating a floating-point adder on an integrated circuit, wherein the method comprises:
receiving first and second numbers each having a mantissa and an exponent;
routing the first and second numbers to a near path when a difference in the exponents is equal to or less than a predetermined threshold;
routing the first and second numbers to a far path when the difference in the exponents exceeds the predetermined threshold;
operating the floating-point adder in a first mode to support a first mantissa size for the first and second numbers;
operating the floating-point adder in a second mode to support a second mantissa size that is different than the first mantissa size;
determining a first maximum mantissa shift amount for the first mode; and
determining a second maximum mantissa shift amount that is different than the first maximum mantissa shift amount for the second mode.

12. The method of claim 11, further comprising:
left justifying the mantissas of the first and second numbers during both the first and second modes.

13. The method of claim 11, further comprising:
right justifying sticky bits for the first and second numbers during both the first and second modes.

14. The method of claim 11, further comprising:
generating a sticky bit by combining a first number of least significant bits (LSBs) in the second number during the first mode; and
generating the sticky bit by combining a second number of LSBs in the second number that is different than the first number during the second mode.

15. An integrated circuit, comprising:
a floating-point adder that receives first and second numbers, each having a mantissa and an exponent, wherein the floating-point adder comprises:
a mantissa alignment circuit; and
an addition circuit, wherein the mantissa alignment circuit and the addition circuit are operable in a first mode that outputs a first sum with a first mantissa size and in a second mode that outputs a second sum with a second mantissa size that is different than the first mantissa size, and wherein the difference in the first and second mantissa sizes is less than or equal to 13.

16. The integrated circuit of claim 15, wherein the mantissa alignment circuit and the addition circuit are operable in a third mode that outputs a third sum with a third mantissa size that is different than the first and second mantissa sizes.

17. The integrated circuit of claim 15, wherein the alignment circuit comprises a maximum shift lookup table (LUT) circuit configured to output a first maximum shift value during the first mode and a second maximum shift value that is different than the first maximum shift value during the second mode.

18. The integrated circuit of claim 17, wherein the alignment circuit further comprises a comparator comprising:
a first input configured to receive the first maximum shift value during the first mode and to receive the second maximum shift value during the second mode; and a second input configured to receive a difference in the exponent of the first number and the exponent of the second number.

19. The integrated circuit of claim 15, wherein the alignment circuit comprises a right shifter, and wherein the right shifter comprises sticky bit generation circuitry configured by a control signal that is deasserted in the first mode and asserted in the second mode.

20. The integrated circuit of claim 19, wherein the addition circuit comprises:
   a first summing segment;
   a second summing segment; and
   a multiplexing circuit coupled between the first and second summing segments, wherein the multiplexing circuit is configured by the control signal.

* * * * *